US006978444B1

(12) United States Patent
Farchi et al.

(10) Patent No.: US 6,978,444 B1
(45) Date of Patent: Dec. 20, 2005

(54) COMPUTER-IMPLEMENTED METHOD AND SYSTEM FOR AUTOMATICALLY INVOKING A PREDETERMINED DEBUGGER COMMAND AT A DESIRED LOCATION OF A SINGLE THREAD OF A PROGRAM

(75) Inventors: Eitan Farchi, Pardes Hanna (IL); Shmuol Ur, D.N. Misgav (IL); Avi Ziv, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 872 days.

(21) Appl. No.: 09/630,411

(22) Filed: Aug. 1, 2000

(51) Int. Cl.$^7$ ............................................. G06F 9/44
(52) U.S. Cl. ........................................ 717/129; 714/38
(58) Field of Search ............................ 717/124–135, 717/149, 151, 158; 714/38

(56) References Cited

U.S. PATENT DOCUMENTS

| | | | | | |
|---|---|---|---|---|---|
| 5,870,607 | A | * | 2/1999 | Netzer ........................ | 717/127 |
| 5,970,245 | A | * | 10/1999 | Poteat et al. ................ | 717/128 |
| 6,052,739 | A | * | 4/2000 | Bopardikar et al. ........ | 719/321 |
| 6,067,544 | A | * | 5/2000 | Moore ........................... | 707/6 |
| 6,282,701 | B1 | * | 8/2001 | Wygodny et al. ............ | 717/125 |
| 6,286,130 | B1 | * | 9/2001 | Poulsen et al. ............... | 717/119 |
| 6,311,326 | B1 | * | 10/2001 | Shagam ........................ | 717/128 |
| 6,388,533 | B2 | * | 5/2002 | Swoboda ...................... | 331/57 |
| 6,550,062 | B2 | * | 4/2003 | Barajas et al. ................ | 717/178 |
| 2001/0044856 | A1 | * | 11/2001 | Agesen et al. ............... | 709/315 |
| 2003/0126521 | A1 | * | 7/2003 | Radestock .................... | 714/100 |

OTHER PUBLICATIONS

"Tracer viewer" by International Business Machines Corporation, "Research Disclosure Journal," Research Disclosure No.: 41583, Nov. 1998.*
"Using Assertions in Declarative and Operational Models for Automated Debugging" by Peter Fritzson et al., 1994.*
"Generalized Algorithmic Debugging and Testing" by Peter Fritzson et al., 1992.*
"Deterministic Replay of Java Multithreaded Applications", by Jong–Deok Choi and Harini and Drinivasan, 1998.*
"Implicit–Specification Errors and Automatic, Trace–Based Debugging", by Edward G Okie and James D. Arthur, 1993.*
"Dynamic Program Slicing" by Hirala Agrawal and Joseph R. Horgan, 1990.*

* cited by examiner

*Primary Examiner*—St. John Courtenay, III
(74) *Attorney, Agent, or Firm*—Browdy and Neimark, P.L.L.C.

(57) ABSTRACT

A computer-implemented method and system for automatically invoking a predetermined debugger command at a desired location of a single thread of a program containing at least one thread. At the desired location of the program thread, there is embedded a utility which reads a trace file in which the predetermined debugger command has been previously embedded. Upon re-running the program, the trace file is read and upon reaching the predetermined debugger command, the debugger attaches itself to the running process and executes the process from its current program counter. The debugger is invoked only if there is a discrepancy between successive runs of the program.

42 Claims, 4 Drawing Sheets

COMPUTER-IMPLEMENTED METHOD AND SYSTEM FOR AUTOMATICALLY INVOKING A PREDETERMINED DEBUGGER COMMAND AT A DESIRED LOCATION OF A SINGLE THREAD OF A PROGRAM

FIELD OF THE INVENTION

This invention relates to computer program debuggers.

BACKGROUND OF THE INVENTION

Program debugging is done in one of the following two ways. According to a first approach, a debugger is used, a debugger being a tool that enables a partial execution of the program, stopping at predefined points such as lines of code or variable values. A second way is log-based debugging, wherein print statements are added to the program. When a test is executed a log is created. This log is examined off-line by the programmer to look for places where the behavior of the program deviates from the expected behavior. There also exist debugging tools that display traces of executions and show what happens during the execution. Once the location of a problem is found using these tools, other tools such as a debugger are used to debug the program. It is not possible, after identifying the location of the problem, to return to the actual program to investigate the state of the program. Getting to the correct location using a debugger can be a difficult problem, because algorithmic debugging, i.e. locating a bug, is difficult once a fault occurs. Algorithmic debugging is used to support locating a defect once a fault is found, as described in web site "*Generalized algorithmic debugging and testing*" by Peter Fritzson et al. appearing in "*ACM Letters on programming languages and testing*", 1:303–322, 1992.

There are many existing debugging tools and there are several trace visualization tools available, but there are no tools that combine the use of debugging commands and trace control together.

SUMMARY OF THE INVENTION

It is therefore an object of the invention to provide a method and system for automatically invoking a predetermined debugger command at a desired location of a single thread of a program.

To this end there is provided in accordance with a first aspect of the invention a computer-implemented method for automatically invoking at least one predetermined debugger command at a desired location of a single thread of a program containing at least one thread, said method comprising:

(a) embedding within said single thread at said desired location thereof a utility which reads a trace file in which said at least one predetermined debugger command has been previously embedded; and (b) running the program so that on reaching said desired location, the utility is invoked for reading said trace file and invoking said at least one predetermined debugger command.

The method according to the invention thus combines log-based debugging and use of a debugger. By such means, it is possible to examine the log and then to start the program, using the debugger at a point selected by the user. Such an approach may be implemented on large, multi-threaded programs containing hundreds of threads.

Implementation is especially difficult in the context of multi-threaded programs, owing to the fact that execution may result in different interleaving each time the program is run. That is to say that the mutual sequence in which more than one thread perform their instructions may not be constant, since from each thread's point of view, all that is important is that it performs its own instructions in the correct sequence providing that the integrity of the values of variables as read by the thread is not compromised. Such integrity is assured by the replay mechanism as explained below. It does not matter if that sequence is interrupted to allow another thread to perform instructions. However, this may have an effect on correct generation of, the trace file.

The solution according to the invention requires several components:

(i) an instrumentation scheme, which allows the user to put specialized print statements in the program, both manually and automatically, to create trace files.

(ii) a modified debugger that can be executed "against" the trace files. This debugger, when encountering an instrumentation statement, will check the trace file. If the trace file contains a debugger command (such as show current program status) it will execute it, else it will continue if appropriate. This is the appearance to the user. Implementation may be done without modifying the debugger.

(iii) a number of supporting algorithms used to re-execute the program with the same multi-threading interleaving, and, if needed, to create a naming scheme for threads or to match between threads and traces.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Figure 1:
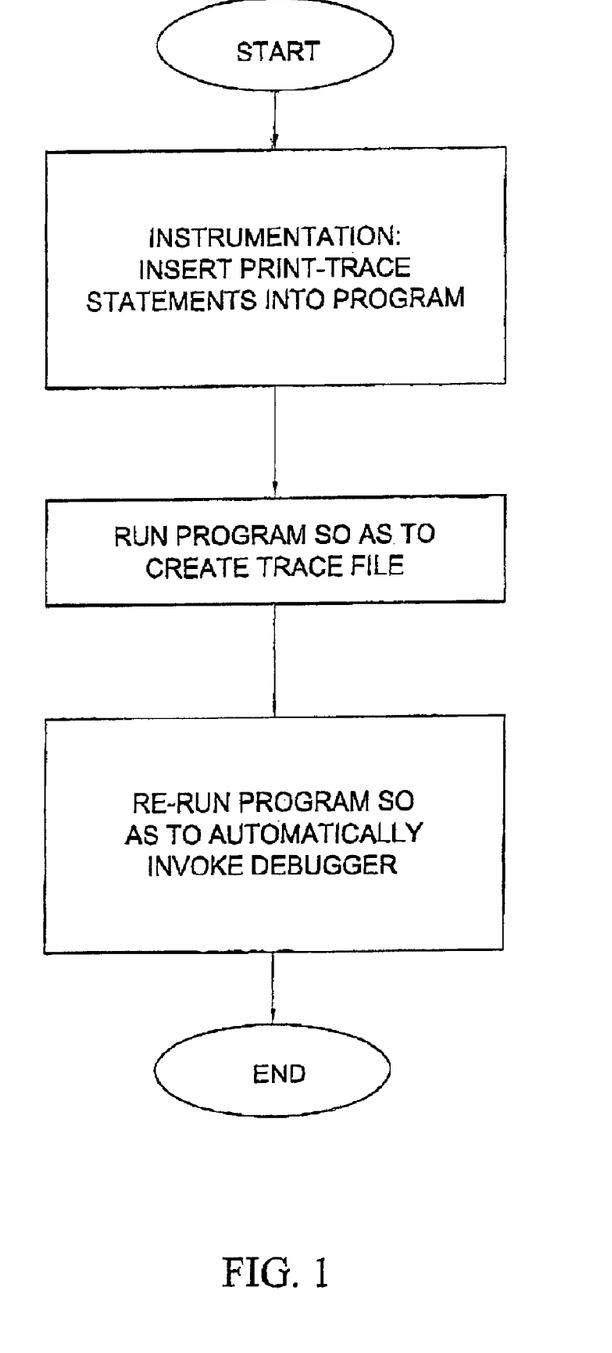
FIG. 1 is a flow diagram showing the principal operating steps carried out by a method according to a first embodiment of the invention for invoking a debugger from a trace file.

FIG. 1 is a flow diagram showing the main operating steps carried out by a method according to a first embodiment of the invention for invoking a debugger from a trace file. In common with known tracing techniques, print statements are inserted into the program source code so as to output the value of a specified variable at each location in the program where the value of the variable is significant and where it may be important subsequently to invoke a debugger command. However, unlike known tracing techniques, the print statements that are inserted into the program source code are a modified print function, "Trace-print", that operates differently according to whether or not a trace file already exists. Specifically, the modified print function creates a trace file if the file does not exist, and writes the value of the variables thereto.

This having been done, a programmer takes the trace file and reviews it line by line. When he or she comes across a value which appears suspect, a debugger command is either inserted into the trace file before the line in the trace file corresponding to the suspect line or, alternatively substitutes the line containing suspect variable with a debugger command.

This having been done, the program is re-run. It is assumed that the program retraces its previous steps as recorded in the trace file until it reaches the first modified print function.

Figure 2:
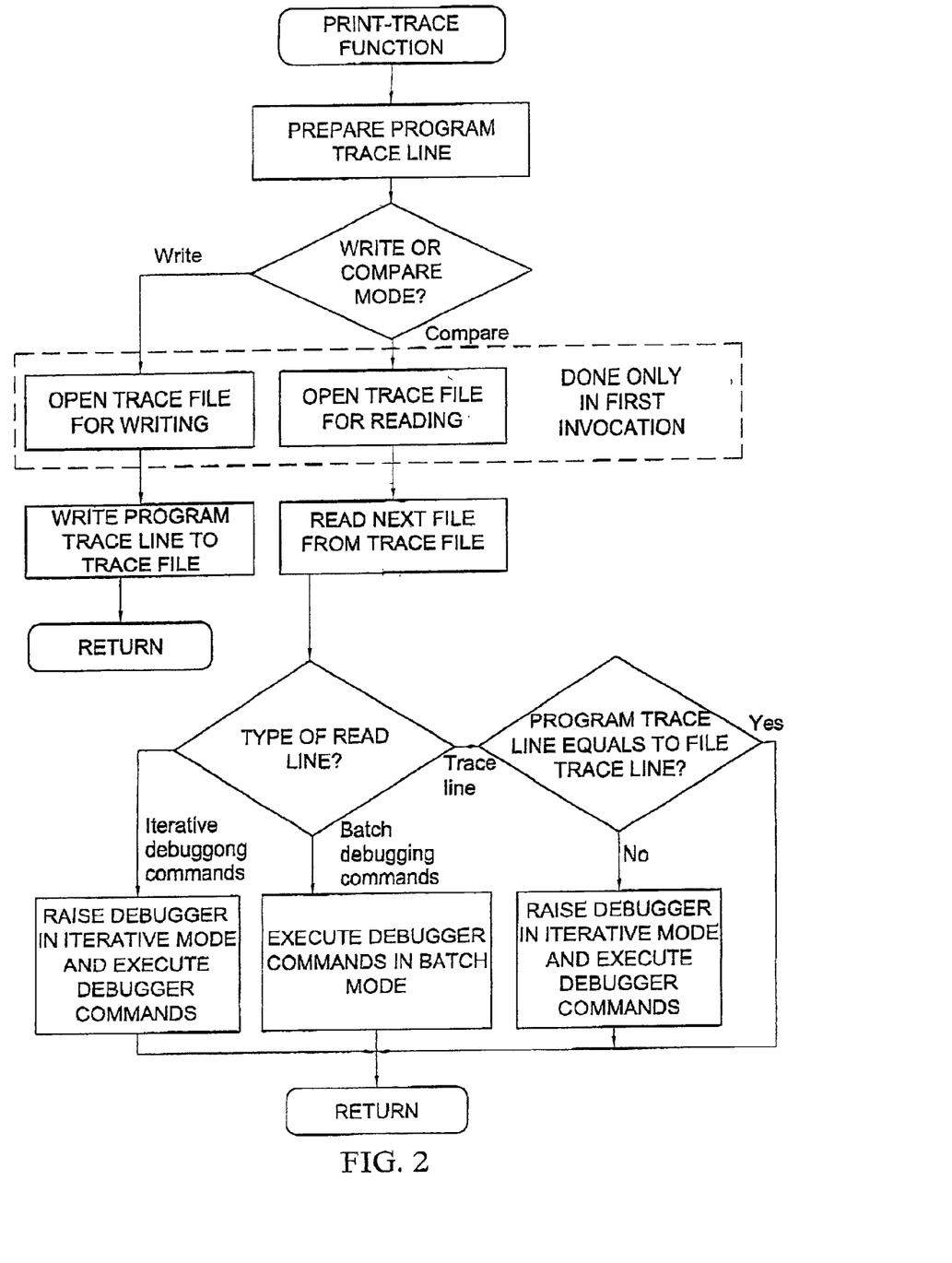
FIG. 2 is a flow diagram showing the principal operating steps carried by a "Trace-Print" function inserted into program code in the method shown in FIG. 1.

FIG. 2 shows the principal operating steps carried by the modified print function, "Trace-Print". Thus, as noted above, on determining that the file does not exist, the Trace-Print function creates a trace file and writes the value of the variables thereto. However, if the trace file does already exist, then the current value of the variable output by the program at the current location of the Trace-Print function is compared with a respective line in the trace file. If they are different, the Trace-Print function construes the respective line in the trace file as a debugger command and invokes a debugger so as to execute the debugger command.

A particular example follows wherein different components of the invention are described in greater detail.
Instrumentation:

Functions of the form Trace-Print (Trace-Name, Content) are added to the program. Preferably, this is done automatically, using a menu, in all locations of a specific type defined by the programmer (e.g. beginning of routines, places where a particular variable "X" is used, etc.). In the case of multi-threaded programs, automatic choice of the trace granularity ensures replay ability. Alternatively, the Trace-Print functions may be added to the program manually. Replay ability is described in "*Deterministic Replay of Java Multithreaded Applications*", by Jong-Deok Choi and Harini Strnivasan, in the Proceedings of the ACM SIGMETRICS symposium on parallel and distributed tools, 1998.

When the program is executed on a test, a flag called "compare" is set by the Trace-Print function according to whether or not the trace file exists on entry to the Trace-Print function. If the trace file does not exist, then compare is set false and the trace file is created otherwise it is set to true. During subsequent processing, if compare=false, then the Trace-Print function prints Content into file Trace-Name in the form "Trace: Content".

If compare-true, then the program is executed under a modified debugger.
Modified Debugger:

Whenever a Trace-Print function is reached, if the content of Trace-Name is of the form "Debug: Command", then this debugger command is executed. As shown in FIG. 2, such execution can be performed either iteratively or in batch mode.

IF the content is of the form "Trace: Content", THEN

IF the content in the trace file equals Content of Trace-Print, then continue;

ELSE raise the debugger at this point with the appropriate error message.

Alternatively, the function Trace-Print is modified such that if the file Trace-Name is one of the debug trace file names it either writes to the file as above or compares, much like the previous implementation but implemented within the program, possibly as a library. When a point is reached where the debugger is needed, it is invoked from within the program. This implementation will work only for debuggers that can be invoked while the program is running, as is the case with most debuggers. The advantage of this approach is that the debugger is not modified, and it is easy to port between debuggers.

Alternatively, a new application may be created that does not run under the debugger. Such an application accepts as input a trace file and a stream of outputs from the executing program: and compares the stream to the trace file. If the stream is different, it halts the program and raises a debugger. Such an approach has the advantage that the user program is not modified and the application is not language specific. In either case, application of the debugger gives rise to delays and it is therefore hard to break the program exactly at the desired location.

One possible solution to this is to employ an architecture called "King" (or any other from the published solutions) for re-executing the program with the same interleaving as fair as the Trace-Print function is concerned. The king is a synchronization object able to influence, record and enforce interleaving.

The king architecture is used to record the order in which concurrent programs are executed and to rerun concurrent programs in the same or similar order. This architecture is used to support interactive definition, of timing related tests. The tester can select a thread and advance it to a chosen program location. A King architecture contains the following elements:

The king architecture has two modes 'record' and 'replay'. When the program is run in record mode, the king gets called when a snapshot statement is reached. The king then records the order in which snapshot operations occurred When the program is run in 'replay' mode, the king is called when snapshots statements are reached. The king then determines which thread to advance in order to force the recorded execution order.

The king uses a language to record and replay an execution order. The simplest possible language used by the king is a sequence of commands each advancing a certain thread to the next snapshot instruction, e.g., thread 1 A; thread 1 B; thread 2 A;

The user can use this language interactively to define the execution order.

When running multi-thread programs, each thread may write to its own trace file and when the programmer analyzes the trace file, it must clear to which thread the traced variables refer. To this end, some consistent naming scheme is required that ensures that allocates a unique name to each thread-dependent trace file and ensures that each thread writes to its own trace file.

In an example of the present invention, a method for identifying if there is no correlation between threads and traces uses bipartite matching. The method is based on the idea that initially each thread is matched to all traces. As a thread prints content, the matching is restricted to the subset of the traces that match that content. If there is no bipartite matching from the threads to the traces after a print, then the program is stopped so as to avoid executing debugger commands embedded in each of the traces at the wrong time.

Figure 3:
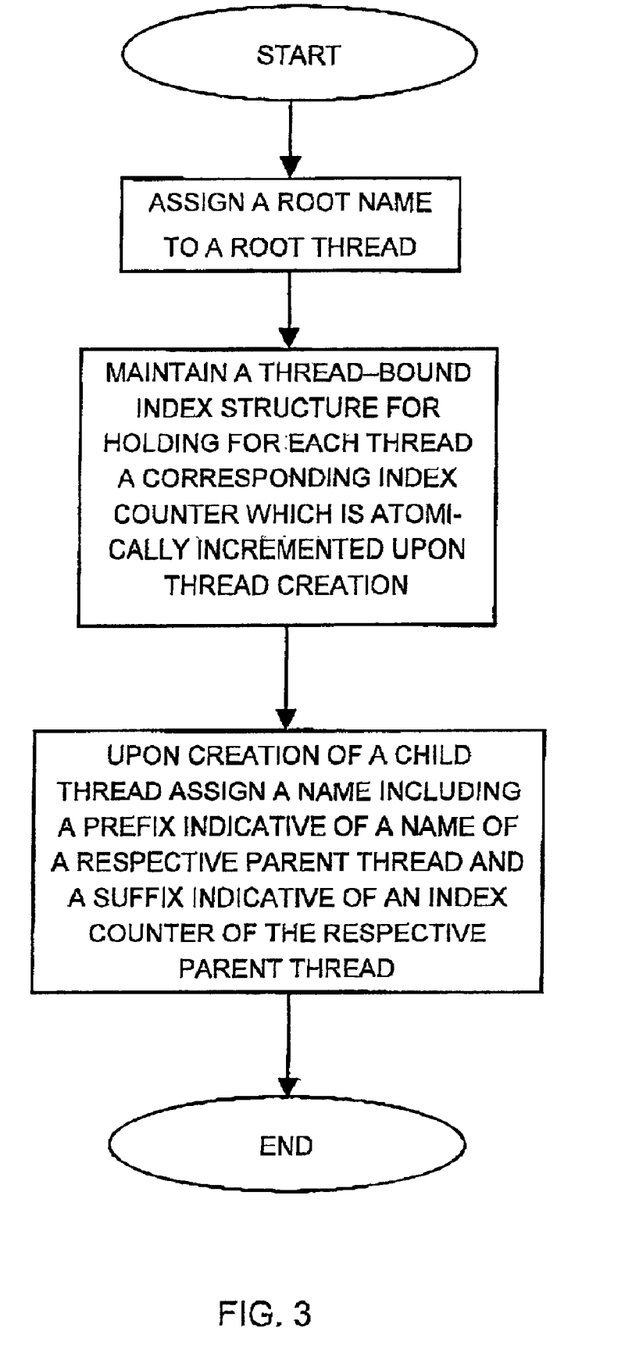
FIG. 3 is a flow diagram showing the principal operating steps carried by a scheme for automatic naming of trace files as a function of a creating thread's name.

FIG. 3 shows the principal steps associated with a consistent naming algorithm according to the invention for threads based on the following observations:

A thread always has a parent thread (except for the Main Thread—i.e. the thread which starts the program).

Since each thread executes its code sequentially, the creation time of every child thread, per parent thread, is unique.

Assumptions:
  When the system starts, there is only a single thread, called the Main Thread, or the Root Thread.
  There exists a thread bound :index structure, i.e. for each thread created, there is a data structure, which holds an index counter;
  Update of the index counter is atomic.
  Thread creation time is: defined as the first time a thread was created (e.g. rising the new command for thread object creation in Java), rather than the time the new thread starts executing, which could be system dependent and inconsistent across program executions.
The algorithm:
  As the Main Threads starts, it is named as Main, and an index structure is created for it, whose index is initialized to be 1. For each newly created child thread, at Thread creation time, do:
    Create child thread name by using its parent name as a prefix and its parent index as suffix.
    Increase parent thread's index by 1.
    Create an index structure for the child thread and initialize its index to 1.

Figure 4:
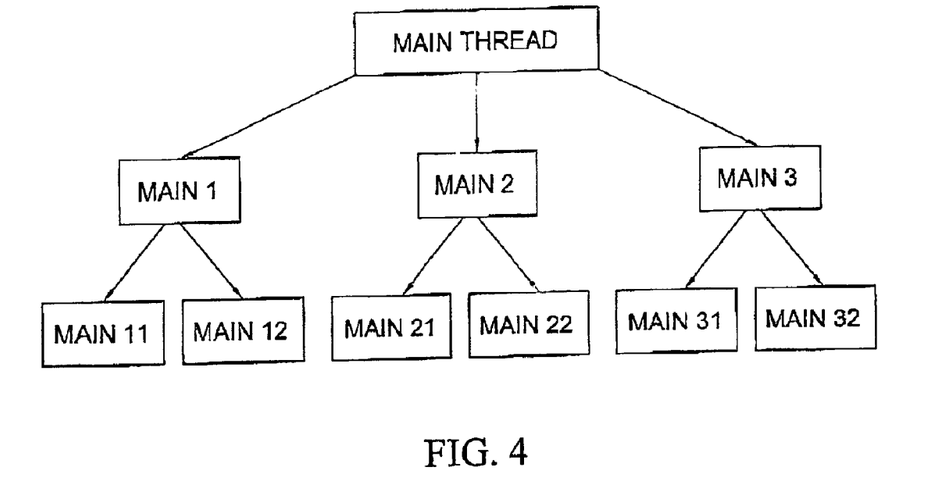
FIG. 4 is a pictorial representation of a tree structure depicting a scheme for automatic naming of trace files as a function of a creating thread's name.

FIG. 4 is a pictorial representation of a tree structure depicting the above-described algorithm for automatic naming of trace files as a function of a creating thread's name. Since by definition, thread creation time is unique, and since the creation time is used to produce a unique name for every newly created thread, every thread during the lifetime of a program has a unique name. In addition, this unique name is preserved across program re-execution, as long as each thread maintains the same order of child thread creation.

Figure 5:
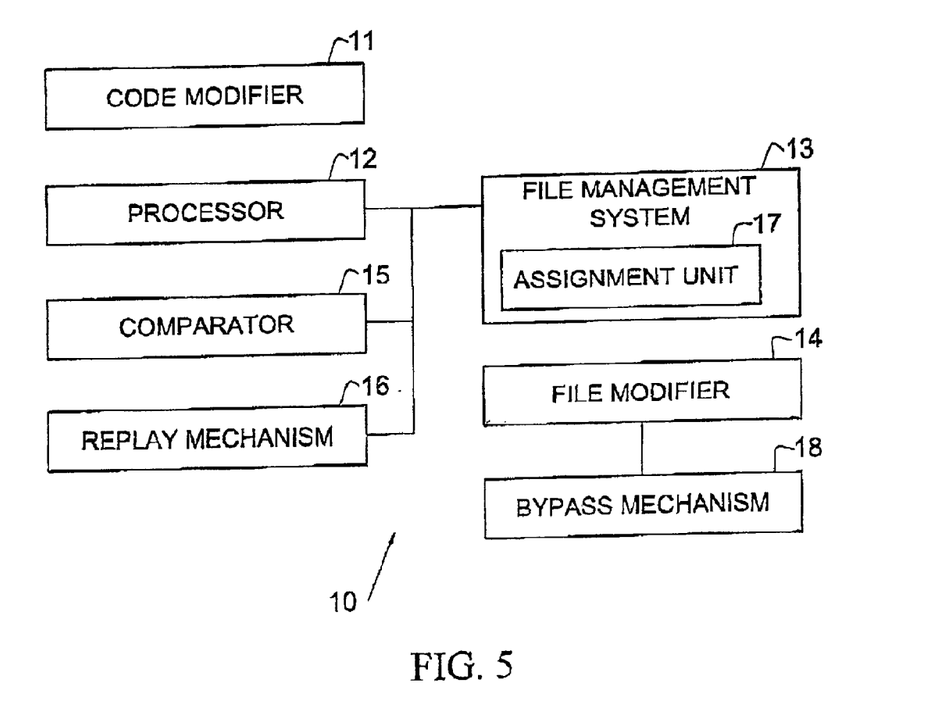
FIG. 5 is a block diagram showing functionally a system for carrying out the invention.

FIG. 5 is a block diagram showing functionally a computer-implemented system 10 for automatically invoking a predetermined debugger command, at a desired location of a single thread of a program containing at least one thread. The system 10 comprises a code modifier 11 for embedding within the program thread at the desired location thereof a utility, which reads a trace file in which the predetermined debugger command has been previously embedded. A processor 12 reads the trace file during running of the program and invokes the predetermined debugger command. A file management system 13 is coupled to the processor 12 and is responsive to the embedded utility for checking whether a trace file exists, and for creating the trace file if it does not exist. A file modifier 14 coupled to the file management system 13 is responsive to the trace file being created for writing to trace file a traced, value of at least one variable at the desired location of the program. A comparator 15 is coupled to the processor 12 for comparing a current value of the least one variable with a respective line in the trace file. If they are different, the comparator 15 construes the respective line in the trace file as a debugger command and invokes a debugger so as to execute the debugger command.

The program may be multi-threaded in which case there is further included a replay mechanism 16 coupled to the processor 12 for rerunning the program with identical interleaving as far as instrumentation statements are concerned. The processor 12 may further be adapted to run the program for reading a modified trace file readable by the programs wherein at least one traced value is replaced or augmented by the debugger command.

Likewise, in the event that the system is used with multi-threaded program, the file management system 13 may be adapted to create for each thread a respective trace file having a name which is uniquely defined by a name of the respective thread, thereby allowing debugger commands embedded in any of the trace files to be executed during a respective one of the threads.

The file management system 1 may also be responsive to a predetermined execution-independent naming scheme for automatically naming the trace files. To this end, the file management system 13 includes an assignment unit 17 for assigning a root name to a root thread, and a thread-bound index structure 18 for holding for each thread a corresponding index counter, which is atomically incremented upon thread creation. The assignment unit 17 is responsive to creation of a child thread for assigning a name including a prefix indicative of a name of a respective parent thread and a suffix indicative of an index counter of the respective parent thread. The assignment unit 17 is responsive to no consistent naming being possible for attempting a bipartite matching between the threads and the traces such that every thread has a trace which contains what the thread printed, and for stopping the program so as to avoid executing debugger commands embedded in each of the traces at the wrong time if bipartite matching is not possible.

A bypass mechanism 18 coupled to the file modifier 14 allows creation of the trace file to be manually or automatically bypassed so that traces are created in respect of only a subset of the threads. The processor 12 may be adapted to read the modified trace file in respect of local views of the threads-only, so as to avoid a need for synchronizing breakpoints in multiple threads of a multithreaded program.

It will also be understood that the system according to the invention may be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

In the method claims that follow, alphabetic characters used to designate claim steps are provided for convenience only and do not imply any particular order of performing the steps.

What is claimed is:

1. A computer-implemented method for automatically invoking at least one predetermined debugger command at a desired location of a single thread of a program containing at least one thread for debugging said single thread at the desired location, said method comprising:
   (a) embedding within said single thread at said desired location thereof a utility that is configured for creating a trace file if the trace file does not exist;
   (b) running the program during a first pass so as to create the trace file and write a traced value of a specified variable at the location in the program where the utility is embedded; and
   (c) running the program during a second pass so that on reaching said desired location, the utility is invoked for reading said trace file and invoking said at least one predetermined debugger command that has been previously embedded in the trace file in place of the traced value of said variable.

2. The method according to claim 1, wherein the debugger attaches itself to a predetermined debugger command, which halts execution of the program and shows a state of the program at that time.

3. The method according to claim 1, wherein the program is multi-threaded and there is included the further operation of:
   (c) providing a mechanism for rerunning the program with identical interleaving as far as invocation of the utility is concerned.

4. The method according to claim 3, further including the operation of creating the mechanism automatically upon invocation of the utility.

5. The method according to claim 3, wherein the program includes multiple threads, each of which prints an invariant associated with a status of the program, said invariant having a value that remains constant regardless of the interleaving.

6. A computer-implemented method for automatically invoking at least one predetermined debugger command at a desired location of a specific thread of a program containing at least one thread, said method comprising:
   (a) embedding within the specific thread of the program at said desired location thereof a utility which:
      i) creates a trace file if it does not exist;
      ii) if a compare flag is set to a first value, writes a traced value of at least one variable thereto at a desired location of the program; and
      iii) if the compare flag is set to a second value compares a current value of the least one variable with a respective line in the trace file and if they are different invokes a debugger so as to execute a debugger command embedded in the trace file in place of the traced value; and
   (b) running the program so that on reaching said desired location, the utility is invoked for reading a modified trace file readable by the program wherein at least one traced value is replaced or augmented by said debugger command.

7. The method according to claim 6, wherein the at least one predetermined debugger command halts execution of the program and shows the state of the program at that time.

8. The method according to claim 6, wherein the program is multi-threaded and there is included the further operation of:
   (c) providing a mechanism for rerunning the program with identical interleaving as far as invocation of the utility is concerned.

9. The method according to claim 8, including the further operation of creating the mechanism automatically upon invocation of the utility.

10. The method according to claim 8, wherein the program includes multiple threads, each of which prints an invariant associated with a status of the program, said invariant having a value that remains constant regardless of the interleaving.

11. The method according to claim 10, wherein operation (a)(ii) includes:
    i) attempting a bipartite matching between the threads and the traces such that every thread has a trace which contains what the thread printed, and
    ii) stopping the program if said bipartite matching is not possible.

12. The method according to claim 10, further including providing a mechanism for manually or automatically bypassing step (a)(ii) so that traces are created in respect of only a subset of the threads.

13. The method according to claim 10, wherein operation (b) includes:
    i) reading the modified trace file in respect of local views of the threads only, so as to avoid a need for synchronizing break-points in said multiple threads.

14. The method according to claim 6, wherein the program includes multiple threads and operation (a)(ii) includes:
    i) creating for each thread a respective trace file having a name which is uniquely defined by a name of the respective thread;

thereby allowing debugger commands embedded in any of the trace files to be executed during running of a respective one of the threads.

15. The method according to claim 14, further including the operation of automatically naming said trace files according to a predetermined execution-independent naming scheme.

16. The method according to claim 15, wherein said naming scheme includes:
    i) assigning a root name to a root thread,
    ii) maintaining a thread-bound index structure for holding, for each thread, a corresponding index counter which is atomically incremented upon thread creation, and
    iii) upon creation of a child thread assigning a name including a prefix indicative of a name of a respective parent thread and a suffix indicative of an index counter of the respective parent thread.

17. The method according to claim 6, further including setting the compare flag to the second value on exit from the program.

18. A computer program storage device readable by machine, tangibly embodying a program of instructions executable by the machine to perform a method for automatically invoking at least one predetermined debugger command at a desired location of a single thread of a program containing at least one thread for debugging said single thread at the desired location, said method comprising:
    (a) embedding within said program thread at said desired location thereof a utility that is configured for creating a trace file if the trace file does not exist;
    (b) running the program during a first pass so as to create the trace file and write a traced value of a specified variable at the location in the program where the utility is embedded; and
    (c) running the program during a second pass so that on reaching said desired location, the utility is invoked for reading said trace file and invoking at least one predetermined debugger command that has been previously embedded in the trace file in place of the traced value of said variable.

19. A computer program product comprising a computer useable medium having computer readable program code embodied therein for automatically invoking at least one predetermined debugger command at a desired location of a single thread of a program containing at least one thread for debugging said single thread at the desired location, said computer program product comprising:
    computer readable program code for causing the computer to embed within said program thread at said desired location thereof a utility that is configured for creating a trace file if the trace file does not exist and which otherwise reads the trace file;
    computer readable program code responsive to a flag being set to a first value for causing the computer to write to the trace file a traced value of a specified variable at the location in the program where the utility is embedded; and
    computer readable program code responsive to the flag being set to a second value for causing the computer to invoke the utility on reaching said desired location for reading said trace file and invoking at least one predetermined debugger command that has been previously embedded in the trace file in place of the traced value of said variable.

20. The computer program product according to claim 19, further including setting the flag to the second value on exit from the program.

21. A computer program storage device readable by machine, tangibly embodying a program of instructions executable by the machine to perform a method for automatically invoking at least one predetermined debugger command at a desired location of a specific thread of a program containing at least one thread, said method comprising:
  (a) embedding within the specific thread of the program at said desired location thereof a utility which:
    i) if a compare flag is set to a first value, creates the trace file if it does not exist and writes to the trace file a traced value of at least one variable thereto at a desired location of the program; and
    ii) if a compare flag is set to a second value, compares a current value of the least one variable with a respective line in the trace file and if they are different invokes a debugger so as to execute a debugger command embedded in the trace file in place of the traced value; and
  (b) running the program so that on reaching said desired location, the utility is invoked for reading a modified trace file readable by the program wherein at least one traced value is replaced or augmented by said debugger command.

22. The computer program storage device according to claim 21, further including setting the compare flag to the second value on exit from the program.

23. A computer program product comprising a computer useable medium having computer readable program code embodied therein for automatically invoking at least one predetermined debugger command at a desired location of a specific thread of a program containing at least one thread, said computer program product comprising:
  computer readable program code for causing the computer to embed within the specific thread of the program at said desired location thereof a utility which reads a trace file in which said at least one predetermined debugger command has been previously embedded;
  computer readable program code for causing the computer to create the trace file if the trace file does not exist, and being responsive to a compare flag being set to a first value to write a traced value of at least one variable thereto at a desired location of the program; and
  computer readable program code responsive to the compare flag being set to a second value for causing the computer to compare a current value of the least one variable with a respective line in the trace file, and if they are different to invoke a debugger so as to execute a debugger command embedded in the trace file in place of the traced value; and
  computer readable program code for causing the computer to run the program so that on reaching said desired location, the utility is invoked for reading a modified trace file readable by the program wherein at least one traced value is replaced or augmented by said debugger command.

24. A computer program storage device readable by machine, tangibly embodying a program of instructions executable by the machine to perform a method steps for automatically invoking at least one predetermined debugger command at a desired location of a specific thread of a program containing at least one thread, said method comprising:
  (a) if the trace file does not exist, creating the trace file;
  (b) if a compare flag is set to a first value writing to the trace file a traced value of at least one variable thereto at a desired location of the program; and
  (c) a compare flag is set to a second value, comparing a current value of said at least one variable with a respective line in the trace file and if they are different invoking a debugger so as to execute a debugger command embedded in the trace file in place of the traced value.

25. A computer program product comprising a computer useable medium having computer readable program code embodied therein for automatically invoking at least one predetermined debugger command at a desired location of a specific thread of a program containing at least one thread, said computer program product comprising:
  computer readable program code for causing the computer to create the trace file if the trace file does not exist;
  computer readable program code responsive to a compare flag being set to a first value for causing the computer to write a traced value of at least one variable thereto at a desired location of the program; and
  computer readable program code responsive to the compare flag being set to a second value for causing the computer to compare a current value of the at least one variable with a respective line in the trace file, and if they are different to invoke a debugger so as to execute a debugger command embedded in the trace file in place of the traced value.

26. A computer-implemented system for automatically invoking at least one predetermined debugger command at a desired location of a single thread of a program containing at least one thread for debugging said single thread at the desired location, said system comprising:
  a code modifier for embedding within said single thread at said desired location thereof a utility that is configured for creating a trace file if the trace file does not exist and which is responsive to a compare flag being set to a first value for writing to the trace file a traced value of at least one variable thereto at a desired location of the program; and
  a processor responsive to the compare flag being set to a second value for invoking said utility for reading said trace file during running of the program upon reaching said desired location and invoking said at least one predetermined debugger command that has been previously embedded in the trace file in place of the traced value of said variable.

27. The system according to claim 26, further including:
  a file management system coupled to the processor and responsive to said utility for creating the trace file if it does not exist;
  a file modifier coupled to the file management system and responsive to a compare flag being set to a first value for writing to the trace file a traced value of at least one variable at said desired location of the program; and
  a comparator coupled to the processor and responsive to the compare flag being set to a second value for comparing a current value of the least one variable with a respective line in the trace file and if they are different construing the respective line in the trace file as a debugger command and invoking a debugger so as to execute the debugger command.

28. The system according to claim 26, wherein the debugger is adapted to attach itself to a predetermined debugger command, which halts execution of the program and shows a state of the program at that time.

29. The system according to claim 26, wherein the program is multi-threaded and there is further included a replay mechanism coupled to the processor for rerunning the program with identical interleaving as far as invocation of the utility is concerned.

30. A computer-implemented system for automatically invoking at least one predetermined debugger command at a desired location of a specific thread of a program containing at least one thread, said system comprising:
- a code modifier for embedding within said single thread at said desired location thereof a utility which reads a trace file in which said at least one predetermined debugger command has been previously embedded;
- a file management system coupled to the processor and responsive to said utility for creating the trace file if it does not exist;
- a file modifier coupled to the file management system and responsive to a compare flag being set to a first value for writing to the trace file a traced value of at least one variable at said desired location of the program;
- a processor for running the program so that on reaching said desired location, the utility is invoked for reading a modified trace file readable by the program wherein at least one traced value is replaced or augmented by said debugger command; and
- a comparator coupled to the processor and responsive to a compare flag being set to a second value for comparing a current value of the least one variable with a respective line in the trace file and if they are different construing the respective line in the trace file as a debugger command and invoking a debugger so as to execute the debugger command.

31. The system according to claim 30, wherein the program is multi-threaded and there is further included a replay mechanism coupled to the processor for rerunning the program with identical interleaving as far as invocation of the utility is concerned.

32. The system according to claim 30, wherein the program includes multiple threads and the file management system is adapted to create for each thread a respective trace file having a name which is uniquely defined by a name of the respective thread, thereby allowing debugger commands embedded in any of the trace files to be executed during a respective one of the threads.

33. The system according to claim 32, wherein the file management system is responsive to a predetermined execution-independent naming scheme for automatically naming said trace files.

34. The system according to claim 33, wherein the file management system includes:
- an assignment unit for assigning a root name to a root thread, and
- a thread-bound index structure for holding for each thread a corresponding index counter which is atomically incremented upon thread creation;
- said assignment unit being responsive to creation of a child thread for assigning a name including a prefix indicative of a name of a respective parent thread and a suffix indicative of an index counter of the respective parent thread.

35. The system according to claim 34, wherein the assignment unit is responsive to no consistent naming being possible for attempting a bipartite matching between the threads and the traces such that every thread has a trace which contains what the thread printed, and for stopping the program so as to avoid executing debugger commands embedded in each of the traces at the wrong time if said bipartite matching is not possible.

36. The system according to claim 30, further including a bypass mechanism coupled to the file modifier for allowing creation of the trace file to be manually or automatically bypassed so that traces are created in respect of only a subset of the threads.

37. The system according to claim 30, wherein the processor is adapted to read the modified trace file in respect of local views of the threads only, so as to avoid a need for synchronizing break-points in said multiple threads.

38. The computer program product according to claim 23, further including setting the compare flag to the second value on exit from the program.

39. The computer program storage device according to claim 24, further including setting the compare flag to the second value on exit from the program.

40. The computer program product according to claim 25, further including setting the compare flag to the second value on exit from the program.

41. The system according to claim 26, further including setting the compare flag to the second value on exit from the program.

42. The system according to claim 30, further including setting the compare flag to the second value, on exit from the program.

* * * * *

UNITED STATES PATENT AND TRADEMARK OFFICE
CERTIFICATE OF CORRECTION

PATENT NO. : 6,978,444 B1 Page 1 of 1
APPLICATION NO. : 09/630411
DATED : December 20, 2005
INVENTOR(S) : Farchi et al.

It is certified that error appears in the above-identified patent and that said Letters Patent is hereby corrected as shown below:

1) On the Title Page, in Item 75, the second inventor's name should be spelled --Shmuel--.

Signed and Sealed this

Fifth Day of December, 2006

JON W. DUDAS
*Director of the United States Patent and Trademark Office*